J. M. JONES.
COMBINED GARDEN-IMPLEMENT.
No. 182,366. Patented Sept. 19, 1876.
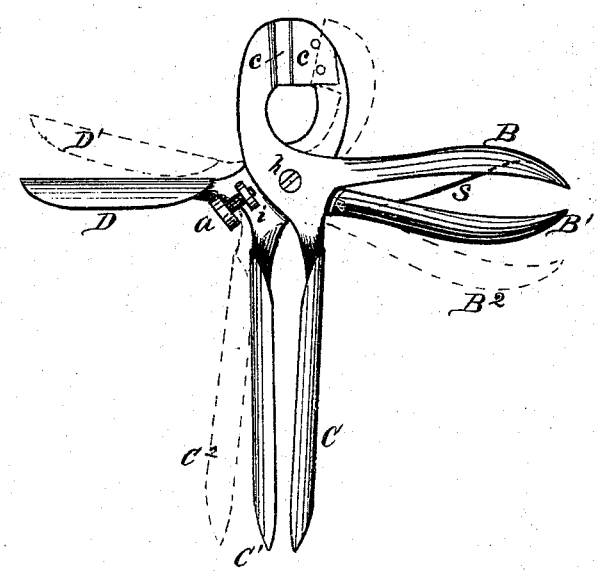
Witnesses.
J. R. Hopper.
M. D. Phillips.
Inventor.
John M. Jones
By M. S. Loughborough
Atty

UNITED STATES PATENT OFFICE.

JOHN M. JONES, OF PALMYRA, NEW YORK.

IMPROVEMENT IN COMBINED GARDEN-IMPLEMENT.

Specification forming part of Letters Patent No. 182,366, dated September 19, 1876; application filed December 31, 1875.

*To all whom it may concern:*

Be it known that I, JOHN M. JONES, of Palmyra, in the county of Wayne and State of New York, have invented a new and useful Combined Garden-Implement; and I do hereby declare that the following is a full, clear, and exact description thereof, reference being had to the accompanying drawing, making part of this specification, in which the figure is a side elevation of my invention.

The object of this invention is to provide a simple and efficient garden and floral tool or implement that may be used for trimming, or transplanting, or for cutting or pulling weeds. It consists in the employment of a combined implement having its parts peculiarly constructed and arranged relatively to adapt it for either weeding, transplanting, or trimming.

The stock of the handles B and B' I preferably form of malleable iron, which permits of their being made very thin and light. They are provided with projecting shanks, to which the weeding and transplanting blades C and C' are riveted or otherwise attached. On the opposite side of the pivot $h$, from the weeding-blades, project light flat or oval shanks, to which are fixed the cutter-blades $c\,c$, which constitute trimming shears or cutters. From the shank of the handle B', and nearly parallel therewith, on the opposite side of the axial point, projects a stem or stock, to which the trowel-blade D is attached. The spring $s$ is fixed to the handle B, and the other end acts upon B' to hold that and its fixtures in the position shown in dotted lines, which is really their normal position. The lug $i$, formed upon the shank of handle B', is tapped to receive the set-screw $a$. By means of this set-screw the spread or degree of opening of the transplanter-blades C and C' and trimming-cutters $c\,c$ may be adjusted to any desired degree.

By grasping the handles the blade D may be used like the ordinary garden-trowel, and for similar purposes.

The cutters $c$ may be employed for trimming strawberry-vines, &c., and for floral trimming.

The blades C and C' are designed more especially for pulling weeds, and for light transplanting. For these purposes the implement should be held in the right hand, and carried or sustained mainly by the fore or index finger, which, being so near the axial point, will not overcome the action of the spring $s$, and, therefore, the handle B' and its attachments will occupy their normal or open position, as indicated by the dotted lines.

If weeds are to be pulled the implement is placed with a blade each side of the root to be withdrawn. The blades are then forced into the earth by pressing upon the handle B, and are firmly closed upon the root of the weed by the grasp of the hand around the handles B and B', and by lifting upon them the weed is withdrawn.

Small plants or roots may be taken up with any desired quantity of earth surrounding them, in a similar manner, for transplanting.

Instead of the strap-spring $s$ a spiral or a rubber spring might be employed, and inserted in the concavity of the handles.

What I claim as my invention is—

1. In combination with the weeding and transplanting blades C C', their handles B B', extending therefrom at right angles, or nearly so, and provided with projections for receiving trimming-cutters $c\,c$ and trowel D, the parts being constructed and arranged substantially as shown, and for the purposes set forth.

2. The handles B B', pivoted together, and provided with projections at right angles thereto for receiving transplanting-blades C C' and trimming-cutters $c\,c$, substantially as and for the purposes set forth.

JOHN M. JONES.

Witnesses:
WM. S. LOUGHBOROUGH,
N. A. PIERCE.